US012602829B2

(12) United States Patent
Shin et al.

(10) Patent No.: US 12,602,829 B2
(45) Date of Patent: Apr. 14, 2026

(54) METHOD AND DEVICE FOR DETERMINING ABNORMALITY IN IMAGE ACQUISITION EQUIPMENT

(71) Applicant: SK ON CO., LTD., Seoul (KR)

(72) Inventors: Dong Whan Shin, Daejeon (KR); Hye Ju Jang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 181 days.

(21) Appl. No.: 18/409,794

(22) Filed: Jan. 11, 2024

(65) Prior Publication Data

US 2024/0265577 A1 Aug. 8, 2024

(30) Foreign Application Priority Data

| | | |
|---|---|---|
| Feb. 7, 2023 | (KR) | ......................... 10-2023-0016438 |
| Jul. 26, 2023 | (KR) | ......................... 10-2023-0097716 |

(51) Int. Cl.
| | |
|---|---|
| G06T 7/80 | (2017.01) |
| G01T 7/00 | (2006.01) |
| G06T 7/00 | (2017.01) |

(52) U.S. Cl.
CPC .................. G06T 7/80 (2017.01); G01T 7/00 (2013.01); G06T 7/0004 (2013.01); G06T 2207/10081 (2013.01); G06T 2207/30108 (2013.01)

(58) Field of Classification Search
CPC ............ G06T 7/80; G06T 7/0004; G01T 7/00
See application file for complete search history.

(56) References Cited

U.S. PATENT DOCUMENTS

| | | | | |
|---|---|---|---|---|
| 4,289,966 A | * | 9/1981 | Roberts | ..................... G01T 1/36 |
| | | | | 250/389 |
| 2007/0003117 A1 | * | 1/2007 | Wheeler | ............... G06T 7/0012 |
| | | | | 382/128 |
| 2015/0022637 A1 | * | 1/2015 | Saeki | .................... G06T 7/0004 |
| | | | | 348/46 |
| 2020/0082520 A1 | * | 3/2020 | Tang | ..................... G06T 7/0004 |
| 2021/0123870 A1 | * | 4/2021 | Mahajan | ............. H01M 10/488 |
| 2022/0101506 A1 | * | 3/2022 | Jiang | .................. G01N 21/9501 |
| 2024/0369712 A1 | * | 11/2024 | Akamatsu | ............. G01S 17/931 |

FOREIGN PATENT DOCUMENTS

| | | |
|---|---|---|
| KR | 10-2012-0131835 A | 12/2012 |
| KR | 10-2017-0093515 A | 8/2017 |
| KR | 10-2034648 B1 | 10/2019 |

* cited by examiner

*Primary Examiner* — Hugh Maupin
(74) *Attorney, Agent, or Firm* — IP & T GROUP LLP

(57) ABSTRACT

According to various embodiments, there may be provided a method for determining an abnormality in image acquisition equipment, which includes: acquiring one or more 2-dimensional (2D) images by imaging a specific region; acquiring at least one of an average brightness value, a signal to noise ratio (SNR) value and a contrast to noise ratio (CNR) value for the one or more acquired 2-dimensional images; and determining whether the image acquisition equipment is abnormal based on the at least one of the acquired average brightness value, SNR value and CNR value, and a device therefor.

10 Claims, 9 Drawing Sheets

[FIG. 1]
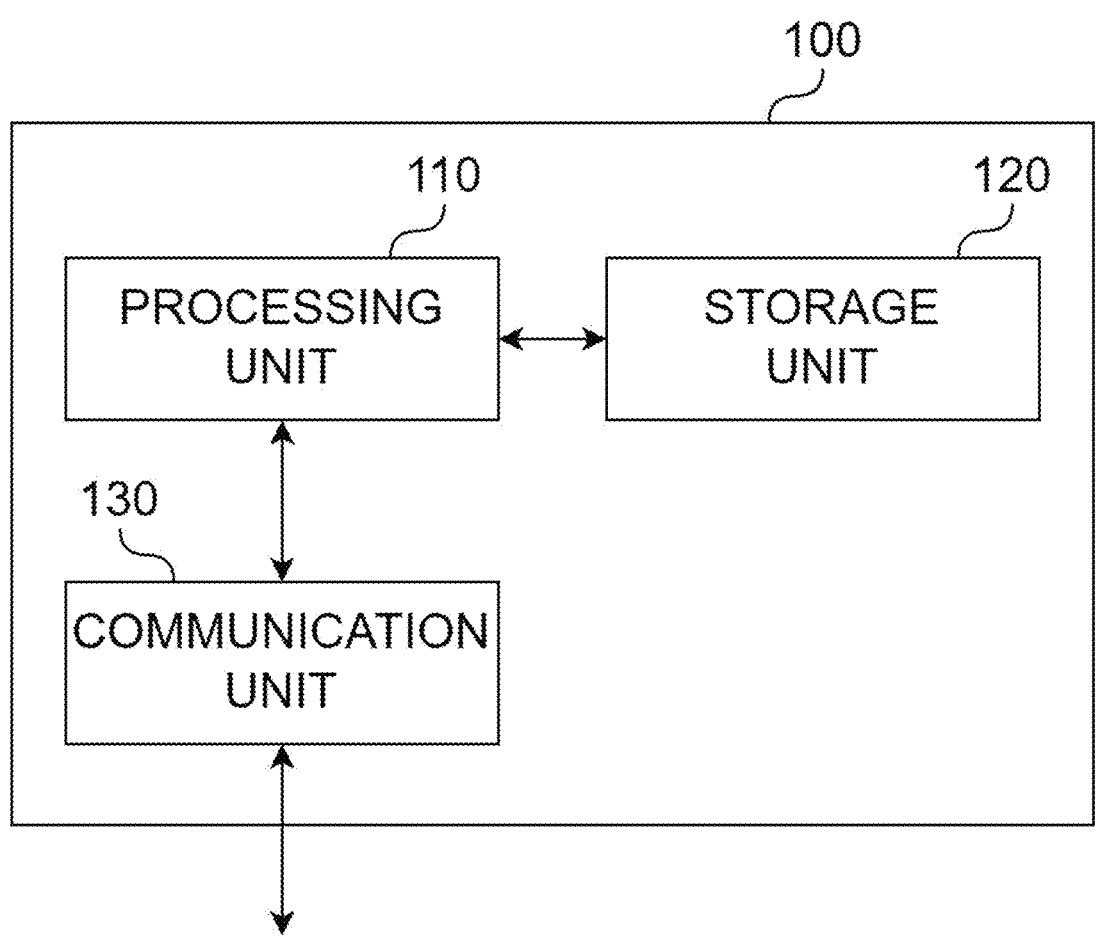

[FIG. 2]
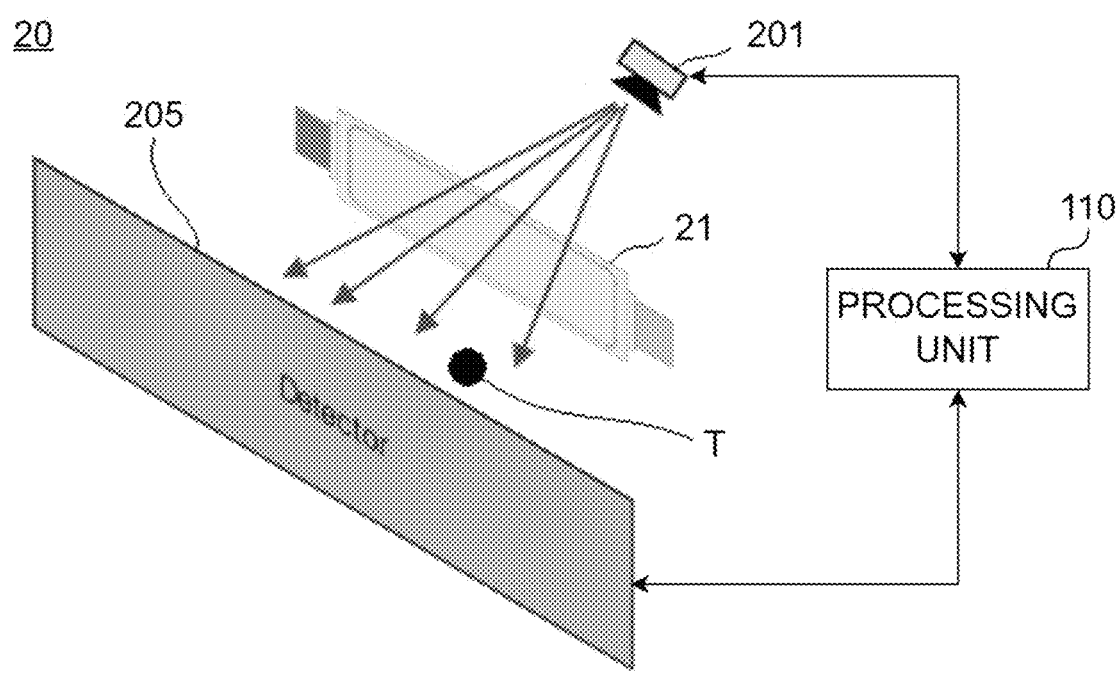

[FIG. 3]
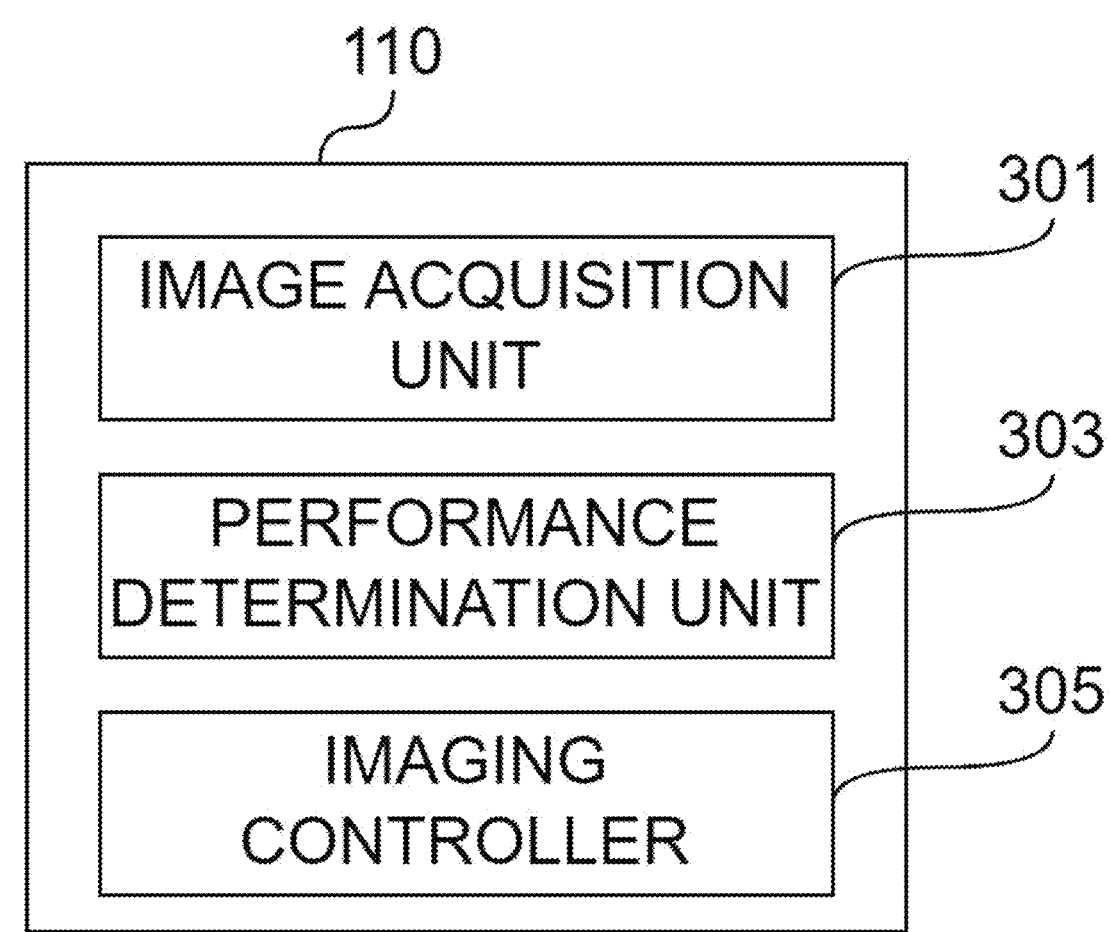

[FIG. 4]
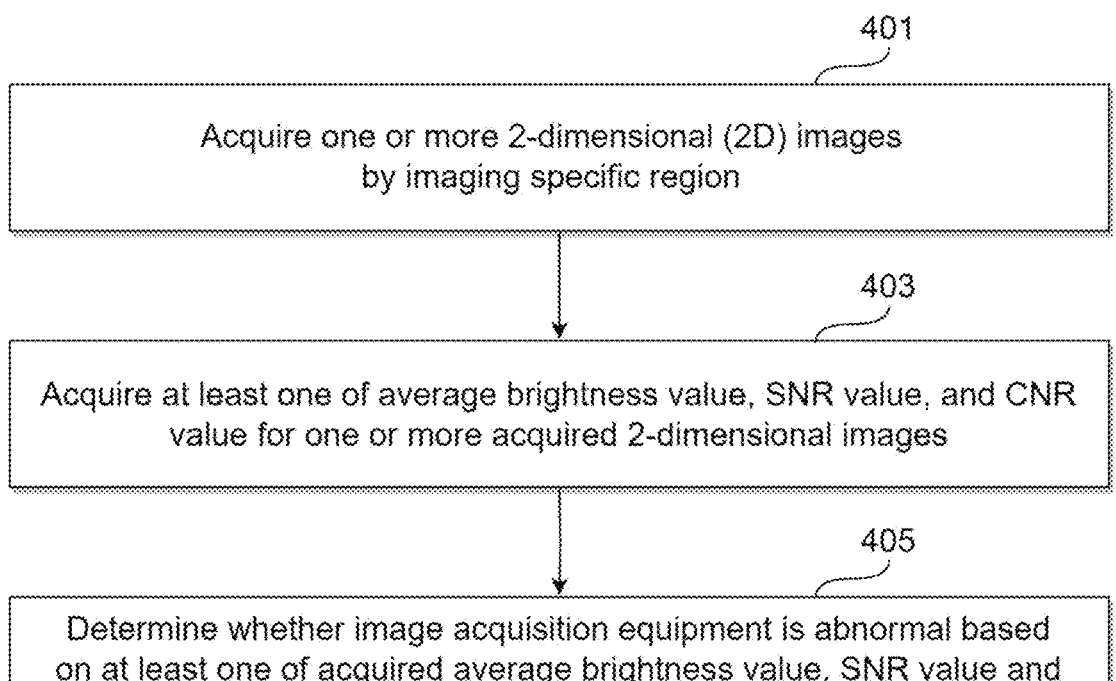

[FIG. 5]
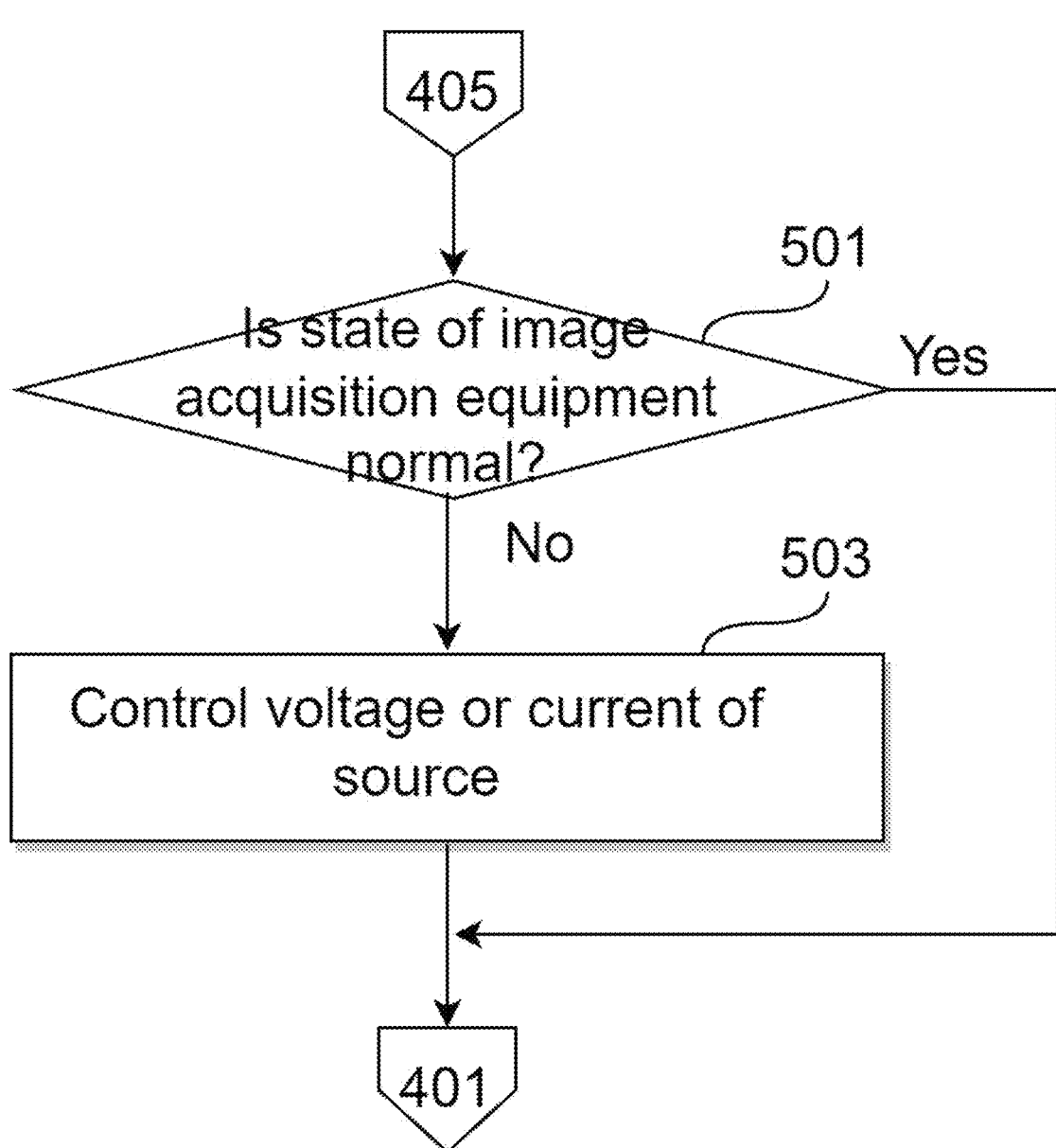

[FIG. 6]
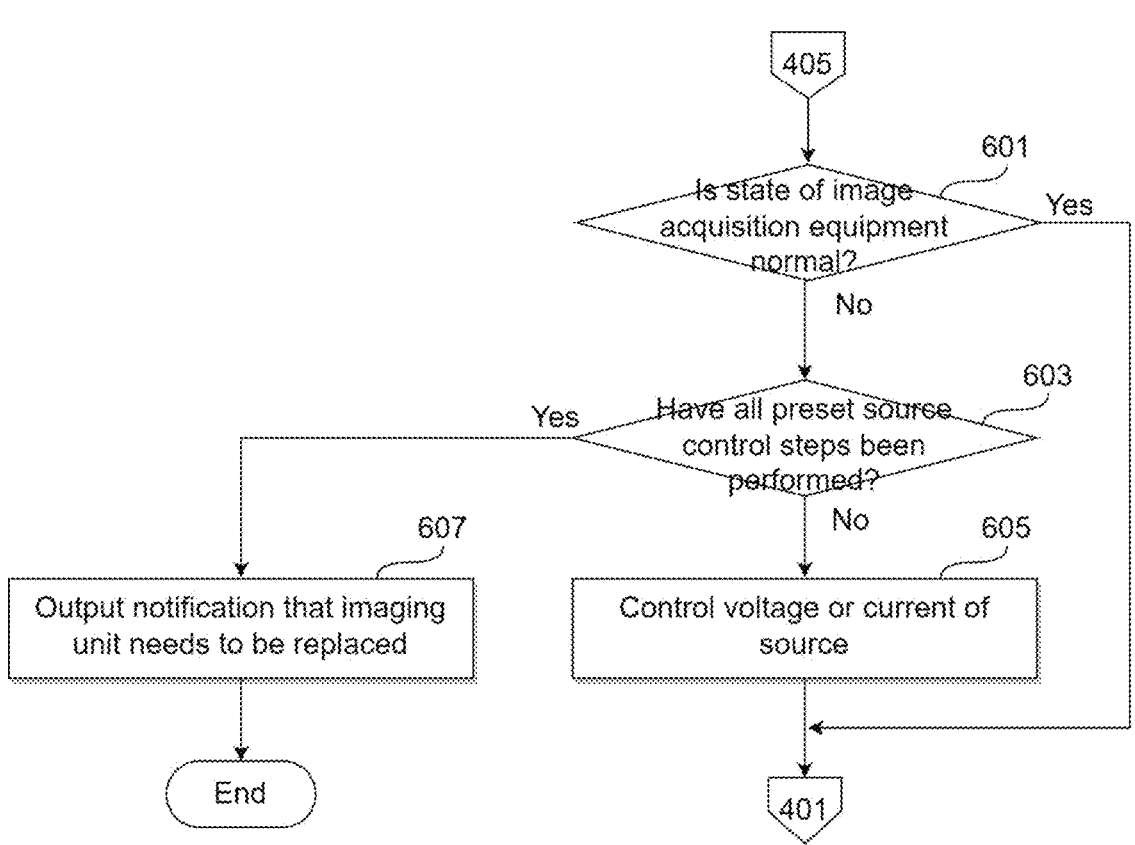

[FIG. 7]

[FIG. 8]
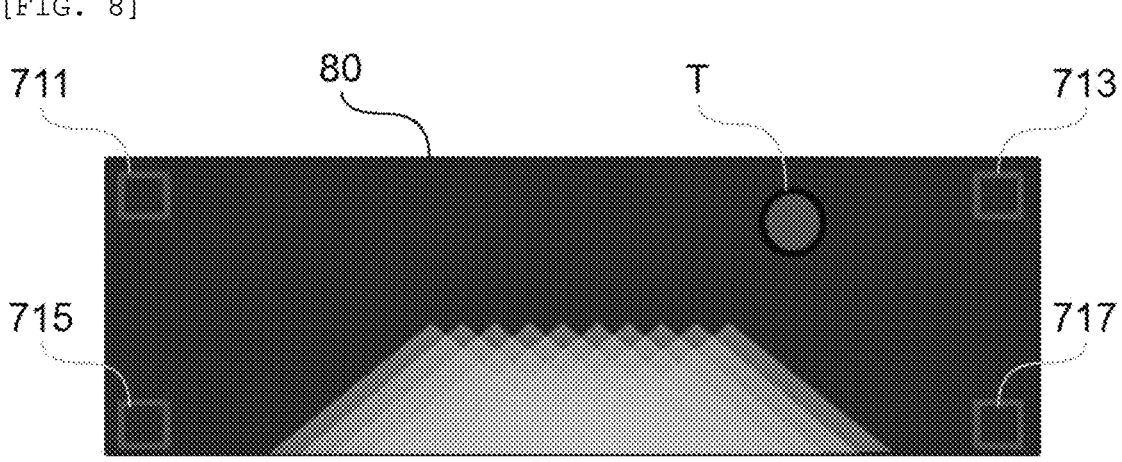

[FIG. 9]
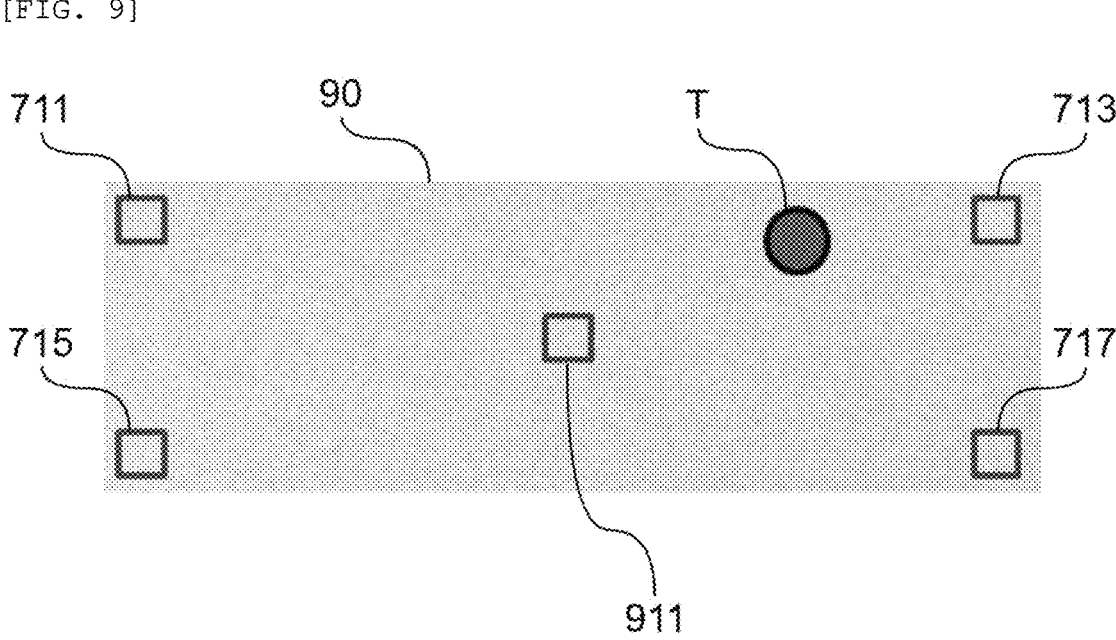

METHOD AND DEVICE FOR DETERMINING ABNORMALITY IN IMAGE ACQUISITION EQUIPMENT

CROSS-REFERENCE TO RELATED APPLICATION(S)

This application claims priorities under 35 U.S.C. § 119 to Korean Patent Application Nos. 10-2023-0016438, filed on Feb. 7, 2023 and 10-2023-0097716, filed on Jul. 26, 2023 in the Korean Intellectual Property Office, the disclosures of which are incorporated herein by reference in its entirety.

BACKGROUND OF THE INVENTION

1. Field of the Invention

The present disclosure relates to a method and a device for determining an abnormality in image acquisition equipment.

2. Description of the Related Art

In general, a battery pack for a vehicle is manufactured by assembling a plurality of cells to form a battery module, and then assembling a plurality of battery modules to prepare a battery pack in a form of being finally mounted on the vehicle. This type of battery module satisfies the required reference voltage and capacity by stacking and adhering a predetermined number of the cells, followed by assembling the same.

However, when stacking the plurality of cells, it is very important to manage cell stacking alignment for ensuring additional component assembly, electrical connection quality between the components, and cooling performance in the post-process.

The cells for constituting the battery module include an anode plate, a cathode plate, and a separation membrane interposed between the anode plate and the cathode plate. The anode plate is provided with an anode lead, and the cathode plate is provided with a cathode lead. The above-described cell is formed in a structure in which the anode plate, the separation membrane, and the cathode plate are sequentially stacked, and then wrapped by a pouch in this state, that is, in the form of a multi-layered structure.

A secondary battery prepared in the above-described form stores and releases an electrical energy through a chemical reaction which occurs at the electrodes during the charging and discharging processes. In this case, if positions of the electrodes are incorrect, problems may occur during the charging and discharging processes. Therefore, exactly measuring and inspecting the positions of the electrodes are one of the important processes to ensure the performance of the secondary battery.

As a device for inspecting whether positions of the electrodes are accurately aligned, there is an inspection device used in the art, which precisely measures the positions of electrodes inside a battery using radiation such as X-rays, and analyzes the measured results to determine the positional accuracy of the electrodes.

In this inspection device, the performance and life-span of components of a source or detection unit are decreased depending on the number of uses. Therefore, if the performance is reduced to a predetermined level or less, problems such as a deterioration in the quality of images acquired by imaging positions of the electrodes inside the battery, and a reduction in the accuracy of determining the positions of the electrodes may occur.

Accordingly, there is a need to develop technique capable of monitoring the performance of the source or detector during an operation of the above-described inspection device, then determining and informing the replacement time of parts.

SUMMARY OF THE INVENTION

It is an object of the present disclosure to provide a method and a device for predicting performance degradation of image acquisition equipment and determining the replacement time of parts.

The problems to be solved through various embodiments are not limited to the above-described problems, and other problems not described above will be clearly understood by those skilled in the art from the following descriptions.

To achieve the above objects, according to an aspect of the present invention, there is provided a method for determining an abnormality in image acquisition equipment, which includes: acquiring one or more 2-dimensional (2D) images by imaging a specific region; acquiring at least one of an average brightness value, a signal to noise ratio (SNR) value and a contrast to noise ratio (CNR) value for the one or more acquired 2-dimensional images; and determining whether the image acquisition equipment is abnormal based on the at least one of the acquired average brightness value, SNR value and CNR value.

Here, the one or more 2-dimensional images may be an image for at least one category among a plurality of categories in which original images acquired by image capturing, and preprocessed images before generating a 3-dimensional image based on the original images are divided.

Here, the at least one category of the category for the original images and the category for the preprocessed images may be characterized in that a category for images captured with a specimen including battery cell type electrodes being placed and a category for images captured with the specimen being removed are divided.

Here, the one or more acquired 2-dimensional images may include at least some of images captured with a sample being placed in the specific region, and images captured with the sample being placed so as not to be overlapped with at least a portion of the specimen when the specimen is placed in the specific region, and the CNR value is acquired based on the sample in each of the one or more 2-dimensional images.

In the step of determining whether the image acquisition equipment is abnormal, if it is determined that the image acquisition equipment is abnormal as a result of the determination, the method may further include controlling at least some values of a voltage and a current of a source configured to capture the images, and after performing the step of controlling the at least some values, performing the step of acquiring the at least one value and the step of determining whether the image acquisition equipment is abnormal.

In the step of controlling at least some values, if the step of controlling the voltage with a control value or the step of controlling the current with a control value satisfies a preset control step, the method may further include determining and outputting an abnormal state of the source.

According to another aspect of the present invention, there is provided a device for determining an abnormality in image acquisition equipment, which includes: an image acquisition unit configured to acquire one or more 2-dimensional images by imaging a specific region including battery cell type electrodes; and a performance determination unit configured to acquire at least one of an average brightness value, a signal to noise ratio (SNR) value and a contrast to noise ratio (CNR) value for the one or more acquired 2-dimensional images, and determine whether the image acquisition equipment is abnormal based on the at least one of the acquired average brightness value, SNR value and CNR value.

Here, the image acquisition unit may determine, for the one or more 2-dimensional images, at least one category among a plurality of categories in which original images acquired by image capturing, and preprocessed images before generating a 3-dimensional image based on the original images are divided.

Here, the image acquisition unit may determine, for the one or more 2-dimensional images in which the category for the original images or the category for the preprocessed images has been determined, a category for the images captured with a specimen being included or a category for the images captured with the specimen being removed.

Here, the one or more acquired 2-dimensional images may include at least some of images captured with a sample being placed in the specific region, and images captured with the sample being placed so as not to be overlapped with at least a portion of the specimen when the specimen is placed in the specific region, and the performance determination unit may acquire the CNR value based on the sample in each of the one or more 2-dimensional images.

Here, the device may further include a source controller configured to control at least some values of a voltage and a current of a source configured to capture the images, if it is determined that the image acquisition equipment is in an abnormal state.

Here, the performance determination unit may determine and output the abnormal state of the source, if it is determined that controlling the voltage with a control value or controlling the current with a control value satisfies a preset control value.

According to various embodiments, it is possible to provide a device which detects the average brightness, SNR and CNR from the images captured at each designated time point when imaging the specimen, and compares the detected values with reference values, thereby continuously monitoring changes in the performance of image acquisition equipment.

According to various embodiments, it is possible to provide a device which continuously monitors changes in the performance of the image acquisition equipment, thereby allowing a user to prepare the replacement time of parts and pre-failure in advance before the life-span of the image acquisition equipment ends.

According to various embodiments, it is possible to continuously monitor changes in the performance of the image acquisition equipment and inform the replacement time of parts in advance, thereby processing so that the parts can be replaced before failure of the image acquisition equipment, and thus, maintaining the performance of battery cell type electrode alignment inspection at a high level.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram illustrating the configuration of a device according to an embodiment;

FIG. 2 is a diagram illustrating a schematic configuration of a system including the device according to an embodiment and image acquisition equipment;

FIG. 3 is a block diagram schematically illustrating a processing unit for determining the state of an image acquisition equipment by dividing the operations depending on the functions thereof in the device according to an embodiment;

FIG. 4 is a flowchart illustrating procedures of an operation for determining an abnormality in image acquisition equipment in the device according to an embodiment;

FIG. 5 is a flowchart illustrating a sequence of an operation for controlling a source when it is determined that an imaging unit is in an abnormal state in the device according to an embodiment;

FIG. 6 is a flowchart illustrating a sequence of the operation for controlling the source step by step when it is determined that the imaging unit is in the abnormal state in the device according to an embodiment;

FIG. 7 is a diagram illustrating an original image captured with the acquired specimen being placed ("a specimen-placed original image") in the device according to an embodiment is placed;

FIG. 8 is a diagram illustrating a preprocessed image obtained by preprocessing the original image captured with the acquired specimen being placed in the device according to an embodiment; and FIG. 9 is a diagram illustrating an original image captured with the acquired specimen being not placed in the device according to an embodiment.

DETAILED DESCRIPTION OF THE INVENTION

Hereinafter, embodiments will be described in detail with reference to the accompanying drawings. However, since various changes can be made in the embodiments, the scope of the patent invention is not limited or restricted by these embodiments. It should be understood that all modifications, equivalents, and alternatives for the embodiments are included in the scope of the present invention.

The terms used in the embodiments are used only for the purpose of describing the invention, and should not be interpreted as limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or combinations thereof.

Unless otherwise defined, all terms including technical or scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Further, in describing the embodiments with reference to the accompanying drawings, the same reference numerals are denoted to the same components regardless of the number of the drawings, and the same configuration will not be repeatedly described. Further, in description of the embodiments, the publicly known techniques related to the present invention, which are verified to be able to make the purport of the present invention unnecessarily obscure, will not be described in detail.

In addition, in describing components of the embodiment, the terms such as first, second, A, B, (a), (b), and the like may be used. These terms are intended to distinguish the components from other components, and do not limit the nature, sequence or order of the corresponding components.

It will be understood that when a component is described to as being "connected," "combined" or "coupled" to another component, the component may be directly connected or coupled the another component, but it may be "connected," "combined" or "coupled" to the another component intervening another component may be present.

In addition, it will be understood that when a component is described as being "connected" or "combined" by communication to another component, that component may be connected or combined by wireless or wired communication to the another component, but it may be "connected" or "combined" to the another component intervening another component may be present.

Further, in describing the components of the embodiment, the meaning of "or" may mean each of the components, may mean two or more of the components, or may mean all of the components. For example, it should be understood that the expressions "a, b or c" represent any one of "a," "b," "c," "a and b," "a and c," "b and c," and "a, b and c."

Components included in one embodiment and components including common functions will be described using the same names in other embodiments. The description given in one embodiment may be applied to other embodiments, and therefore will not be described in detail within the overlapping range, unless there is a description opposite thereto.

The device and/or 'data' processed by the device may be expressed in terms of 'information'. Here, the information may be used as a concept including the data.

The present disclosure relates to a method and a device for determining whether there is an abnormality in equipment which acquires images using electromagnetic waves (hereinafter, referred to as an image acquisition equipment), for example, deterioration in the performance of a source or detector.

Here, when describing the image acquisition equipment as an example, it may include an electrode alignment inspection device which inspects the electrode alignment of a specimen including battery cell type electrodes during a secondary battery production process.

For example, the image acquisition equipment acquires a 2-dimensional (2D) image by performing computed tomography (CT) scan of the specimen, and the device according to the present disclosure may determine whether the image acquisition equipment is abnormal based on the captured 2-dimensional image.

According to various embodiments, an image acquisition equipment which performs CT scan of a specimen using X-rays may be described. However, it is not limited thereto, and image acquisition equipment for imaging the specimen in various ways, such as Γ-ray (gamma-ray) and laser, may be applied to various embodiments.

However, it is not limited thereto, and the image acquisition equipment may be applied to various image acquisition equipment configured to capture images of the specimen using electromagnetic waves.

Hereinafter, preferred embodiments will be described with reference to the accompanying drawings. However, the drawings attached to the present specification serve to further understand the technical idea together with the detailed description, such that the present disclosure should not be construed as being limited only to the illustrations of the drawings.

FIG. 1 is a block diagram illustrating the configuration of a device according to an embodiment.

Referring to FIG. 1, a device 100 for determining an abnormality in image acquisition equipment may include a processing unit 110, a storage unit 120, and a communication unit 130.

The processing unit 110 may process control commands related to performance determination of the image acquisition equipment through at least one program (app, application, tool, plug-in, software, etc., hereinafter referred to as equipment performance determination program). In this case, the equipment performance determination program may be stored in the storage unit 120 of the device 100 and/or a storage unit of anther device connected to the device 100.

The processing unit 110 may share data processing and/or processing results with at least one device (e.g., a user device) connected to the device 100 through the equipment performance determination program.

Hereinafter, in various embodiments, it may be understood that performing an operation according to the control commands by the device 100 indicates performing an operation designated through at least one program and/or the equipment performance determination program related to at least one control command processing of the device 100.

Here, it will be described that the control command processing is performed through the at least one program and/or the equipment performance determination program installed in the device 100, but it is not limited thereto, and may be performed through another program or a temporary installation program previously provided and installed in the storage unit 120.

According to an embodiment, the control command processing may be performed through at least a portion of a database provided free of charge or for a fee in an external device connected to the device 100.

The operation of the device 100 is performed based on data processing and device control of the processing unit 110, and the processing unit 110 may also perform functions designated on the basis of the control commands received through an input/output unit (not shown) and/or the communication unit of the device 100.

Further, in processing data acquired through the communication unit 130, the processing unit 110 may process the data based on an identified user. For example, the processing unit 110 may perform an operation according to the control command input by the user device connected to the device through the communication unit 130 and/or the identified user who has been identified through user information.

The storage unit 120 may store various data processed by at least one component (e.g., the processing unit 110 or the communication unit 130) of the device 100. The data may include, for example, a program for control command processing or data processed through the program, and/or input data and output data related thereto.

The storage unit 120 may include an algorithm for control command processing, which includes at least some of an artificial neural network algorithm, a blockchain algorithm, a deep learning algorithm, and a regression analysis algorithm, as well as mechanisms, operators, language models, and big data related thereto.

The storage unit 120 may include data for confirming and processing the control and operations designated through signals received by each of devices included in the input/output unit.

The operations described as functions of the storage unit 120 are processed by the processing unit 110, and data for processing the related operations, data in process, processed data, preset data, and the like may be stored in the storage unit 120 as a database.

The data stored in the storage unit 120 may be changed, modified, deleted, and/or generated as new data by the processing unit 110 based on user input of the identified user.

The storage unit 120 may store device setting information of the device 100. The device setting information may be setting information on the device 100 and at least some of functions and services provided by the device 100.

The storage unit 120 may store user information (or user account) for at least one user.

The storage unit 120 may include a volatile memory, a non-volatile memory, and/or a computer-readable recording medium as known in the art. In this case, the computer-readable recording medium may store a computer program for performing an operation to determine an abnormality in the image acquisition equipment by the device 100 based on various embodiments.

The communication unit 130 may support establishment of a wired communication channel or establishment of a wireless communication channel between the device 100 and at least one other device (e.g., the user device or a server), and performing communication through the established communication channel.

The communication unit 130 may perform operations such as modulation/demodulation and encryption/decryption, etc., during performing communication, which is obvious to those skilled in the art, and therefore will not be described in more detail.

The communication unit 130 may be operated dependently on or independently from the processing unit 110, and may include one or more communication processors which support wireless communication and/or wired communication.

According to an embodiment, when supporting the wireless communication, the communication unit 130 may include at least some communication modules of wireless communication modules, for example, a cellular communication module, a near field communication module, and a global navigation satellite system (GNSS) communication module.

When supporting the wired communication, the communication unit 130 may include at least some communication modules of wired communication modules, for example, a local area network (LAN) communication module, a power line communication module, or a controller area network (CAN) communication module.

To describe in more detail, the communication unit 130 may communicate with the external device by wired and/or wirelessly through near field communication networks such as Bluetooth, Bluetooth Low Energy (BLE), WiFi, WiFi direct, Infrared Data Association (IrDA), ZigBee, UWB, and radio frequency (RF), and/or far field communication networks such as a cellular network, the Internet or a computer network (e.g., LAN or WAN).

Various types of communication modules constituting the communication unit 130 may be integrated into one component (e.g., a single chip), or may be implemented as a plurality of separate components (e.g., a plurality of chips).

According to various embodiments, the device 100 or the user device may include at least some of functions of all information and communication devices including a mobile communication terminal, a multimedia terminal, a wired terminal, a fixed terminal, an internet protocol (IP) terminal and the like.

The device 100 is a device for control command processing, and may include at least some functions of a workstation or a large-capacity database, or may be connected thereto through communication.

As the user device connected to the device 100, a mobile phone, a personal computer (PC), a portable multimedia player (PMP), a mobile internet device (MID), a smartphone, a tablet PC, a phablet PC, a laptop computer, and the like may be exemplified.

According to various embodiments, the user device will be described as a device which is connected to the device 100 and communicates therewith. For example, although not illustrated throughout the drawings, the user device may be a smartphone of the user which is connected to the device 100 through wireless communication and transmits user input so that the device 100 processes the operations related to performance determination of the image acquisition equipment.

The user device may be connected to the device 100 through at least one program installed therein, or may be connected to the device 100 through at least one web page accessed on online by the device 100. To this end, the device 100 may include at least some of the functions of a terminal for processing operations to determine the performance of the electrode inspection device.

The server is one entity that exists on a network, and performs roles of a web server, a database server, and an application server. According to a preferred embodiment, the server may provide various services to the device 100 and/or the user device based on processing of the device 100.

In this regard, FIG. 2 is a diagram illustrating a schematic configuration of a system 20 including the device 100 according to an embodiment and the image acquisition equipment.

Referring to FIG. 2, the system 20 may include the device 100 and the image acquisition equipment.

Here, the image acquisition equipment may include an imaging unit for acquiring 2-dimensional images of a specimen including battery cell type electrodes through image capturing. Here, the imaging unit may include a source unit 201 and a detection unit 205.

The source unit 201 may include a source device (or source) configured to generate and emit X-rays, and the detection unit 205 may include a detection device (or detector) configured to detect the X-rays emitted from the source unit 201.

The processing unit 110 of the device 100 may acquire images which are captured during performing an alignment inspection of the battery cell type electrodes on the specimen in the image acquisition equipment, and determine the performance (or performance state) of the imaging unit of the image acquisition equipment based on the acquired images.

First, hereinafter, an operation for determining the alignment state of the battery cell type electrodes of the specimen in the image acquisition equipment will be schematically described with reference to FIG. 2.

Assuming a state where the specimen is placed between the source unit 201 and the detection unit 205, the image acquisition equipment may emit X-rays toward the specimen from the source unit 201, and generate 2-dimensional images (original images) for a specific region by receiving the emitted X-rays by the detection unit 205. In this case, the source unit 201 or the detection unit 205 may be configured to move about the location of the specimen.

Here, the specific region may be a region within a preset range, including a location where a specimen is placed to image the specimen.

The image acquisition equipment may generate a 3-dimensional (3D) image of the specimen based on the acquired original images. In this case, the image acquisition equipment may generate a 3-dimensional image of the specimen by reconstructing the 2-dimensional images acquired for the specimen.

The image acquisition equipment may set a region of interest (ROI) in at least some of the specimen images included in the 3-dimensional image, and generate one or more cut surface (slice) images based on the set region of interest.

The image acquisition equipment may perform an alignment inspection on the battery cell type electrodes included in the specimen based on the acquired cut surface images. The image acquisition equipment may determine that the alignment of the battery cell type electrodes of the specimen is in a normal or abnormal state.

The processing unit 110 of the device 100 may acquire original images captured for a specific region during the operation of the above-described image acquisition equipment. In this case, the processing unit 110 may acquire one or more original images captured in real time, or at an interval of the designated number of (imaging) times.

According to an embodiment, the device 100 and the image acquisition equipment may be configured as one device, or may be configured as separate devices in the system 20.

When the device 100 and the image acquisition equipment are configured as one device, the processing unit 110 of the device 100 may be configured as a processing unit of the image acquisition equipment. In addition, the storage unit 120 or the communication unit 130 of the device 100 may also be configured as a processing unit of the image acquisition equipment.

When the processing unit 110 of the device 100 is configured as the processing unit of the image acquisition equipment, the processing unit 110 may determine an abnormality in the image acquisition equipment based on the images captured in the specific region through the image acquisition equipment. In this case, the processing unit 110 may be connected to the source unit 201 and the detection unit 205 of the image acquisition equipment.

On the other hand, when the device 100 and the image acquisition equipment are configured as separate devices in the system 20, the processing unit 110 of the device 100 may be connected to a processing unit (not shown) of the image acquisition equipment, or to a communication unit (not shown) of the image acquisition equipment.

Hereinafter, the operation of the device 100 to determine an abnormality in the image acquisition equipment will be described in detail with reference to the drawings.

FIG. 3 is a block diagram illustrating the processing unit 110 for determining the state of the image acquisition equipment by dividing the operations depending on the functions thereof in the device 100 according to an embodiment.

Referring to FIG. 3, the processing unit 110 may include an image acquisition unit 301, a performance determination unit 303, and an imaging controller 305.

The image acquisition unit 301 may acquire 2-dimensional images obtained by imaging the specimen from the imaging unit of the image acquisition equipment at specific time points. In this case, the 2-dimensional images acquired by imaging the specific region may be the original images obtained by imaging the specimen, or 2-dimensional preprocessed images that have been preprocessed to reconstruct a 3-dimensional specimen image.

However, the 2-dimensional images acquired by imaging the specific region may be original images obtained by imaging the specific region with the specimen being removed, or 2-dimensional preprocessed images to reconstruct a 3-dimensional image for the specific region.

In this case, the 2-dimensional image acquired for the specific region by the image acquisition unit 301 may be an image captured together with at least one sample (or standard sample, hereinafter referred to as a sample) for calculating contrast to noise ratio (CNR).

To this end, assuming that the specimen is placed, the at least one sample may be placed within a designated distance from an edge (or boundary) of the specimen so that at least a portion of the sample is not overlapped with the specimen in the 2-dimensional image acquired by imaging the specimen.

The 2-dimensional image acquired by the image acquisition unit 301 for the specific location may be labeled with a category corresponding to at least one state based on the specimen. For example, the 2-dimensional image acquired by the image acquisition unit 301 may be an original image captured with the specimen being placed, a preprocessed image obtained by preprocessing the original image captured with the specimen being placed, or an original image captured with the specimen being not placed.

Figure 7:
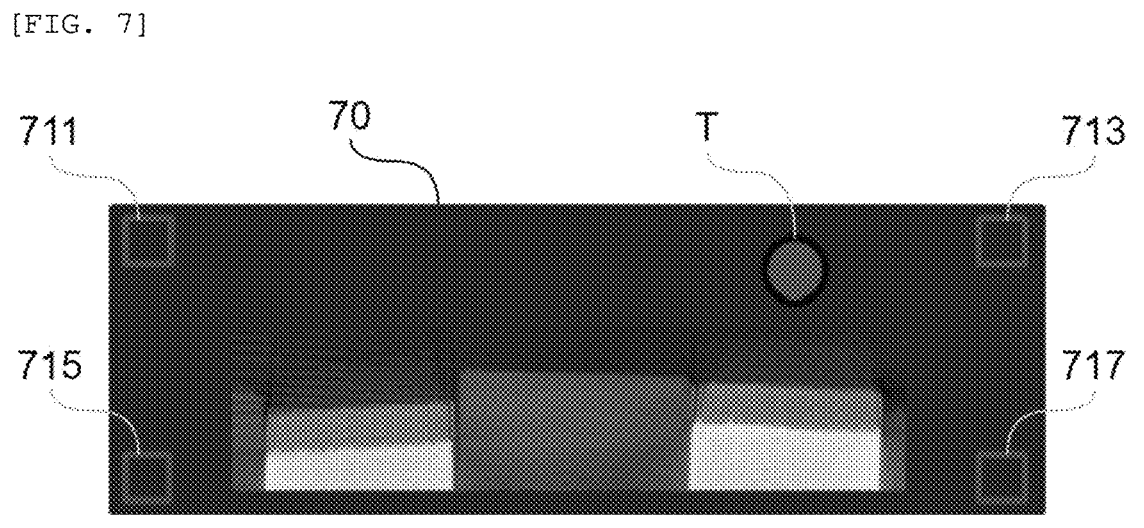

In this regard, the images acquired by the device 100 will be described with reference to FIGS. 7, 8 and 9. FIG. 7 is a diagram illustrating an original image captured with the acquired specimen being placed ("a specimen-placed original image") in the device according to an embodiment is placed.

Referring to FIG. 7, a specimen-placed original image 70 may include a specimen obtained by imaging a specific cross-section, a sample T, and at least one designated ROI 711, 713, 715 or 717.

FIG. 8 is a diagram illustrating a preprocessed image obtained by preprocessing the original image captured with the acquired specimen being placed in the device according to an embodiment.

Referring to FIG. 8, a specimen-placed preprocessed image 80 may include a specimen subjected to preprocessing based on the original image, a sample T, and at least one designated ROI 711, 713, 715 or 717.

FIG. 9 is a diagram illustrating an original image captured with the acquired specimen being not placed in the device according to an embodiment.

Referring to FIG. 9, a specimen-removed original image 90 may include a sample T and at least one designated ROI 711, 713, 715, 717 or 911.

Here, the specimen-removed original image 90 may be an image captured through the imaging unit with the specimen being removed during a specimen replacement process. In addition, as shown in FIGS. 7 to 9, the number and location of the ROIs may be changed depending on setting.

As described above, the 2-dimensional image acquired by the image acquisition unit 301 may be an image for at least one category among a plurality of categories in which original images acquired by image capturing of the specimen, and preprocessed images before generating a 3-dimensional image based on the original images are divided.

In addition, at least one category of the category for the original images and the category for the preprocessed images, divided as described above, may be a state where a category for the images acquired by imaging the specific region with the specimen being placed and a category for the images acquired by imaging the specific region with the specimen being removed are divided.

In this regard, according to various embodiments, the original images captured with the specimen acquired by the image acquisition unit 301 being placed may be labeled with a category for the specimen-placed original images, the preprocessed images obtained by preprocessing the original image captured with the specimen being placed may be labeled with a category for the specimen-placed preprocessed images, or the original images captured with the specimen being not placed may be labeled with a category for the specimen-removed original images. When it is determined that the acquired images are not labeled with the category for the corresponding images, the image acquisition unit 301 may verify the category of the acquired images, and label the corresponding images with the verified category.

The performance determination unit 303 may acquire values for at least one item among an average brightness, a signal to noise ratio (SNR), and a contrast to noise ratio (CNR) for the acquired images.

As an example of determining the average brightness, the performance determination unit 303 may calculate an average brightness of images acquired at the specific time points, an average brightness of samples included in the acquired images, or an average brightness of the ROI designated for the acquired images.

According to an embodiment of calculating the average brightness of images, the performance determination unit 303 may verify the brightness values of pixels included in the images acquired at the specific time points. The performance determination unit 303 may determine a value, which is obtained by adding all the brightness values of the pixels included in the images and dividing it by the total number of pixels in the images, as the average brightness of the images.

According to an embodiment of calculating the average brightness of the samples included in the images, the performance determination unit 303 may extract a sample region from each of the images acquired at the specific time points, and verify the brightness values of the pixels included in the sample region. The performance determination unit 303 may determine a value, which is obtained by adding all the brightness values of the pixels included in the samples of the acquired images and dividing it by the total number of pixels in the samples of the images, as the average brightness of the samples.

According to an embodiment of calculating the average brightness of the designated ROIs for images, the performance determination unit 303 may extract at least one designated ROI region from each of the images acquired at the specific time points, and verify the brightness values of the pixels included in the ROI region. The performance determination unit 303 may determine a value, which is obtained by adding all the brightness values of the pixels included in the ROI region of the acquired images and dividing it by the total number of pixels in the ROI region of the images, as the average brightness of the ROIs.

As an example of determining the SNR, the performance determination unit 303 may calculate an average SNR of the images acquired at the specific time points.

According to an embodiment, the performance determination unit 303 may distinguish between signal and noise for the respective images acquired at the specific time points, and calculate an average signal value and an average noise value of the images. The performance determination unit 303 may calculate a ratio of the signal average value and noise average value of the images acquired at the specific time points to determine the SNR for the images.

In this case, when at least one ROI is preset for the images, the performance determination unit 303 may distinguish between signal and noise for the ROI of the images acquired at the specific time points, and calculate an average signal value and an average noise value for the ROIs included in the images. The performance determination unit 303 may calculate a ratio of the signal average value and noise average value for the ROI of the images acquired at the specific time points to determine the SNR for the images.

As an example of determining the CNR, the performance determination unit 303 may calculate the CNR of the images acquired at the specific time points.

According to an embodiment, the performance determination unit 303 may extract a sample region and a background region except the specimen for each of the images acquired at the specific time points, and distinguish noise for each of the images. In addition, the performance determination unit 303 may calculate average brightness values for the sample region and background region included in the images, and calculate a standard deviation of the noise. In addition, the performance determination unit 303 may determine a value obtained by a difference value between the average brightness value of the sample region and the average brightness value of the background region for the images by a standard deviation of the noise as the CNR of the images.

According to the above description, the operation for calculating the average brightness, SNR and CNR for a plurality of the images acquired at the specific time points by the performance determination unit 303 has been described.

However, when there is only one image acquired at the specific time point, the performance determination unit 303 may calculate an average brightness, SNR or CNR for one image by the same or similar method as the method for calculating the average brightness, SNR or CNR for the plurality of images.

In addition, when performing the operation for determining the average brightness, SNR or CNR for the images, the performance determination unit 303 may calculate an average brightness, SNR or CNR including one or more specimen-removed original images.

When the average brightness, SNR or CNR for one or more images acquired at the specific time points is acquired, the performance determination unit 303 may determine the state (e.g., abnormal state, or normal state) of the imaging unit by comparing the acquired values with the reference average brightness value, reference SNR value or reference CNR value preset in the storage unit 120 corresponding thereto.

Here, the abnormal state of the imaging unit is defined as a state where the performance of the source unit 201 or the detection unit 205 of the imaging unit has been reduced to the reference or less, and the reference average brightness value, reference SNR value or reference CNR value may be applied to the reference value for determining the state.

For example, as the number of uses or the time of use of the source unit 201 or the detection unit 205 of the imaging unit is increased, the performance of at least some of their functions is reduced, then the average brightness value of the acquired image is reduced according to this reduction in the performance, and as a result, the SNR value will be increased, and the CNR value will be decreased.

Based on the above principle, the performance determination unit 303 may calculate the average brightness value, SNR value or CNR value for the images acquired while performing the battery cell type electrode alignment inspection on the specimen, and compare the calculated values with the preset reference values to determine the state of the imaging unit.

According to an embodiment for determining the performance of the imaging unit, when the average brightness value acquired for the images acquired at the specific time points is less than the reference average brightness value (e.g., 200 gray), the SNR value acquired for the images acquired at the specific time points is greater than the reference SNR value (e.g., 20), and/or the CNR value acquired for the images acquired at the specific time points is less than the reference CNR value (e.g., 30), the performance determination unit 303 may determine that the imaging unit is in an abnormal state.

However, the reference average brightness value, reference SNR value or reference CNR value may be changed based on the change rate at the verification time or according to the user input.

As an example, the performance determination unit 303 may verify the change rate for each average brightness value, SNR value or CNR value corresponding to the average brightness value, SNR value or CNR value verified at two or more specific time points.

In this case, when the change rate for each of the average brightness value, SNR value or CNR value satisfies the preset reference change rate for each of the average brightness value, SNR value or CNR value, the performance determination unit 303 may change at least some values of the reference average brightness value, reference SNR value and reference CNR. Here, the reference change rate may be set as a value, or set as a range.

The performance determination unit 303 may be processed to control the source, or output the abnormal state of the imaging unit by the imaging controller 305 based on the performance determination results for the imaging unit or the source control results of the imaging controller 305.

For example, even if two or more or all of the values of the average brightness, SNR and CNR of the images acquired at the specific time points do not satisfy the reference values, or one of the values of the average brightness, SNR and CNR of the images acquired at the specific time points does not satisfy the reference values, when the source control state of the imaging controller 305 performs all the preset steps after determining the abnormal state of the imaging unit, the performance determination unit 303 may output the abnormal state of the imaging unit.

Here, outputting the abnormal state of the performance determination unit 303 to the imaging unit may be outputting a notification that the source unit 201 or the detection unit 205 needs to be replaced.

The imaging controller 305 may control a voltage of the source to change the X-ray intensity of the source unit 201 or control a current to change the brightness and amplitude of the X-rays.

At this time, in controlling the voltage or current of the source unit 201, the imaging controller 305 may divide the adjustment value into a plurality of stages, and control the voltage or current step by step according to the control order.

Hereinafter, an operation for determining an abnormality in the image acquisition equipment by the components of the processing unit 110 will be described in detail with reference to the drawings.

FIG. 4 is a flowchart illustrating procedures of an operation for determining an abnormality in image acquisition equipment in the device according to an embodiment.

In step 401, the image acquisition unit 301 may acquire one or more 2-dimensional (2D) images by imaging a specific region. To describe in more detail, the image acquisition unit 301 may acquire one or more 2D images captured in the specific region at a first time point.

Here, the image acquisition unit 301 may acquire one or more images of the specimen-placed original image, the specimen-placed preprocessed image, and the specimen-removed original image based on preset information.

In step 403, the performance determination unit 303 may acquire at least one of an average brightness value, a signal to noise ratio (SNR) value and a contrast to noise ratio (CNR) value for the one or more acquired 2-dimensional images.

Here, the one or more acquired 2-dimensional images may include one or more specimen-removed original images, and the performance determination unit 303 may determine the average brightness value, SNR value or CNR value for the one or more acquired 2-dimensional images.

In step 405, the performance determination unit 303 may determine whether the image acquisition equipment is abnormal based on at least one of the acquired average brightness value, SNR value and CNR value.

For example, the performance determination unit 303 may compare the acquired average brightness value, SNR value or CNR value with the reference average brightness value, reference SNR value or reference CNR value previously stored in the storage unit 120, and determine the abnormal or normal state of the imaging unit based on the comparison results.

When determining the imaging unit as a normal state by the performance determination unit 303, the procedures of the embodiment in FIG. 4 may be ended. On the other hand, when determining the imaging unit as ab abnormal state by the performance determination unit 303, a notification that the imaging unit (e.g., the source unit 201 or the detection unit 205) needs to be replaced may be output.

When the notification is output according to the determination results of the performance determination unit 303, the procedures of the embodiment in FIG. 4 may be ended.

According to an embodiment, when the notification that the imaging unit needs to be replaced is output, the processing unit 110 may control the image acquisition equipment to stop the operation thereof.

According to an embodiment, when the preset inspection is completed during the electrode alignment inspection of the specimen, the processing unit 110 may control the image acquisition equipment to stop the operation thereof.

However, it is not limited thereto, and when the imaging unit is in a normal state as a result of the determination in step 405, the device 100 may sequentially and repeatedly perform the operations of at least some of the steps in FIG. 4 without ending the procedures of the embodiment in FIG. 4.

In addition, when the imaging unit is in an abnormal state as a result of the determination in step 405, the device 100 does not output the notification that the imaging unit needs to be replaced, and may control the source of the imaging unit without controlling the image acquisition equipment to stop the operation thereof.

In this regard, FIG. 5 is a flowchart illustrating a sequence of an operation for controlling the source when it is determined that the imaging unit is in the abnormal state in the device according to an embodiment.

According to FIG. 5, in step 501, the performance determination unit 303 may determine the state of the imaging unit of the image acquisition equipment. Here, step 501 will be described as being performed after step 405, but it is not limited thereto, and may also be performed in step 405.

When determining the imaging unit as a normal state by the performance determination unit 303, the processing unit 110 may perform step 401 again without ending the procedures of the embodiment in FIG. 4.

To describe in more detail, when it is determined that the imaging unit is in the abnormal state based on one or more 2-dimensional images acquired at the first time point as described above, the image acquisition unit 301 may acquire one or more 2-dimensional images by returning to step 401, and the performance determination unit 303 may acquire values of the average brightness, signal to noise ratio (SNR), or contrast to noise ratio (CNR) item for the one or more 2-dimensional images acquired at a second time point (403), and may determine whether the image acquisition equipment is abnormal (405) based on the acquired average brightness value, SNR value or CNR value.

That is, in step 405, if determining the imaging unit as a normal state, the device 100 may repeatedly perform steps 401, 403 and 405, and if determining the imaging unit as ab abnormal state by the performance determination unit 303, the device may output a notification that the imaging unit needs to be replaced, and end the procedures of the embodiment in FIG. 4, when the notification is output.

Here, the second time point may be a designated time from the first time point, or a time point after the designated number of times. That is, when determining the imaging unit as the normal state, the device 100 may perform the operation for determining the state of the imaging unit based on steps 401, 403 and 405 at the designated time, or in unit of the designated number of times.

On the other hand, in step 405, when it is determined that the imaging unit is an abnormal state by the performance determination unit 303, step 503 may be performed.

In step 503, the imaging controller 305 may control the voltage or current of the source in the source unit 201. In this case, the imaging controller 305 may control the voltage or current of the source in the source unit 201 step by step based on the control order.

In this regard, FIG. 6 is a flowchart illustrating a sequence of the operation for controlling the source step by step when it is determined that the imaging unit is in the abnormal state in the device according to an embodiment.

According to an embodiment, in this state, the voltage rise may be divided into a plurality of stages (e.g., a first stage and a second stage) for voltage control, and the current rise may be divided into a plurality of stages (e.g., a first stage and a second stage) for current control.

Further, in this state, the voltage may be controlled to rise to the first stage in a first-order control, the current may be controlled to the first stage in a second-order control, and the voltage and current may be controlled to the second stage in a third-order control.

In step 601, the performance determination unit 303 may determine the state of the imaging unit of the image acquisition equipment. At this time, in step 601, the same operation as step 501 in FIG. 5 may be performed. Therefore, step 601 may also be performed in step 405.

If determining the imaging unit as ab abnormal state by the performance determination unit 303, in step 603, the imaging controller 305 may determine whether all the source control according to the preset source control steps have been performed. If all the preset source control steps are not performed, the imaging controller 305 may perform step 605.

In step 605, the imaging controller 305 may verify the control order of the imaging unit and control the voltage or current of the source unit 201 according to the step corresponding to the control order.

To describe in more detail, when it is determined that the imaging unit is in a first abnormal state, the imaging controller 305 may perform control to rise the voltage to the first stage corresponding to the first order control, and then, may sequentially perform control corresponding to the second and third orders in response to the order which determined that the imaging unit was in the abnormal state.

When it is determined that the imaging unit is in the abnormal state in step 601 after applying third-order control, the imaging controller 305 may determine that all the preset source control steps have been performed in step 603, and perform step 607.

In step 607, the imaging controller 305 may output a notification that the imaging unit needs to be replaced, and control the image acquisition equipment to stop the operation thereof.

When step 607 is performed, the processing unit 110 may end the procedures of the embodiment in FIG. 6.

According to the above-described various embodiments, the method and the device for determining whether the image acquisition equipment is abnormal based on the captured image during performing the alignment inspection of the battery cell type electrodes on the specimen have been described. However, these embodiments are intended to clearly describe the configuration, and the scope of rights should not be limited thereto, as well as various methods and devices for determining an abnormality in image acquisition equipment based on the acquired images should also be included in the scope of rights.

According to various embodiments, it is possible to provide a device which detects the average brightness, SNR and CNR from the images captured at each designated time point when imaging a specific region, and compares the detected values with reference values, thereby continuously monitoring changes in the performance of image acquisition equipment.

According to various embodiments, it is possible to provide a device which continuously monitors changes in the performance of the image acquisition equipment, thereby allowing a user to prepare the replacement time of parts and pre-failure in advance before the life-span of the image acquisition equipment ends.

According to various embodiments, it is possible to continuously monitor changes in the performance of the image acquisition equipment and inform the replacement time of parts in advance, thereby processing so that the parts can be replaced before failure of the image acquisition equipment, and thus, maintaining the performance of the image acquisition equipment at a high level.

According to various embodiments, it is possible to determine the state of the image acquisition equipment without a separate stop in the inspection process of the image acquisition equipment by determining the inspection time of the parts in the image acquisition equipment based on the images acquired during operation of the image acquisition equipment.

According to the detailed description above, the functions of various embodiments described as being performed by the device 100 are operations processed through the processing unit 110 of the device 100, and may be performed by organically being connected to the device 100 and/or components of the device connected to the device 100.

As described above, although the embodiments have been described with reference to the limited drawings, it will be apparent to those skilled in the art that various modifications and alternations may be applied thereto based on the various embodiments.

For example, adequate effects may be achieved even if the foregoing processes and methods are carried out in different order than those described above, and/or the above-described elements, such as systems, structures, devices, or circuits, are combined or coupled in different forms and modes than those described above, or substituted or switched with other components or equivalents.

In particular, when describing with reference to the flowchart, it has been described that a plurality of steps are configured and the steps are sequentially executed in a designated order, but it is not necessarily limited to the designated order.

In other words, executing by changing or deleting at least some of the steps described in the flowchart or adding at least one step is applicable as an embodiment, and executing one or more steps in parallel may also be applicable as an embodiment. That is, it is not limited to that the steps are necessarily operated in a time-series order, and should be included in various embodiments of the present disclosure.

Therefore, other implements, other embodiments, and equivalents to claims are within the scope of claims to be describe below.

What is claimed is:

1. A method for determining an abnormality in image acquisition equipment, the method comprising:
    acquiring one or more 2-dimensional (2D) images by imaging a specific region;
    acquiring at least one of an average brightness value, a signal to noise ratio (SNR) value and a contrast to noise ratio (CNR) value for the one or more acquired 2-dimensional images; and
    determining whether the image acquisition equipment is abnormal based on the at least one of the acquired average brightness value, SNR value and CNR value
    wherein the one or more acquired 2-dimensional images comprise at least some of images captured with a sample being placed in the specific region, and images captured with the sample being placed so as not to be overlapped with at least a portion of a specimen when the specimen is placed in the specific region, and
    the CNR value is acquired based on the sample in each of the one or more 2-dimensional images.

2. The method according to claim 1, wherein the one or more 2-dimensional images are an image for at least one category among a plurality of categories in which original images acquired by image capturing, and preprocessed images before generating a 3-dimensional image based on the original images are divided.

3. The method according to claim 2, wherein the at least one category of the category for the original images and the category for the preprocessed images is characterized in that a category for images captured with the specimen including battery cell type electrodes being placed and a category for images captured with the specimen being removed are divided.

4. The method according to claim 1, wherein, in the step of determining whether the image acquisition equipment is abnormal, if it is determined to be abnormal as a result of the determination,
    further comprising controlling at least some values of a voltage and a current of a source configured to capture the images, and
    after performing the step of controlling the at least some values, performing the step of acquiring the at least one value and the step of determining whether the image acquisition equipment is abnormal.

5. The method according to claim 4, wherein, in the step of controlling at least some values, if the step of controlling the voltage with a control value or the step of controlling the current with a control value satisfies a preset control step,
    further comprising determining and outputting an abnormal state of the source.

6. A device for determining an abnormality in image acquisition equipment, the device comprising:
    an image acquisition unit configured to acquire one or more 2-dimensional images by imaging a specific region; and
    a performance determination unit configured to acquire at least one of an average brightness value, a signal to noise ratio (SNR) value and a contrast to noise ratio (CNR) value for the one or more acquired 2-dimensional images, and determine whether the image acquisition equipment is abnormal based on the at least one of the acquired average brightness value, SNR value and CNR value
    wherein the one or more acquired 2-dimensional images comprise at least some of images captured with a sample being placed in the specific region, and images captured with the sample being placed so as not to be overlapped with at least a portion of a specimen when the specimen is placed in the specific region, and
    the performance determination unit acquires the CNR value based on the sample in each of the one or more 2-dimensional images.

7. The device according to claim 6, wherein the image acquisition unit determines, for the one or more 2-dimensional images, at least one category among a plurality of categories in which original images acquired by image capturing, and preprocessed images before generating a 3-dimensional image based on the original images are divided.

8. The device according to claim 7, wherein the image acquisition unit determines, for the one or more 2-dimensional images in which the category for the original images or the category for the preprocessed images has been determined, a category for the images captured with the specimen being included or a category for the images captured with the specimen being removed.

9. The device according to claim 6, further comprising a source controller configured to control at least some values of a voltage and a current of a source configured to capture the images, if it is determined that the image acquisition equipment is in an abnormal state.

10. The device according to claim 9, wherein the performance determination unit determines and outputs the abnormal state of the source, if it is determined that controlling the voltage with a control value or controlling the current with a control value satisfies a preset control value.

* * * * *